United States Patent [19]

Heintges et al.

[11] Patent Number: 4,477,358
[45] Date of Patent: Oct. 16, 1984

[54] PRESSURE/BELT FILTER, PARTICULARLY FOR DEWATERING FINE COAL

[75] Inventors: Siegfried Heintges, Haltern; Werner Strauss, Bochum; Hannes S. Horn, Dortmund, all of Fed. Rep. of Germany

[73] Assignee: Klöckner-Humboldt-Deutz AG, Fed. Rep. of Germany

[21] Appl. No.: 474,525

[22] Filed: Mar. 11, 1983

[30] Foreign Application Priority Data

Mar. 11, 1982 [DE] Fed. Rep. of Germany ....... 3208735
Jan. 25, 1983 [DE] Fed. Rep. of Germany ....... 3302326
Feb. 24, 1983 [DE] Fed. Rep. of Germany ....... 3306362

[51] Int. Cl.³ .............................................. B01D 33/02
[52] U.S. Cl. .................................... 210/783; 210/210; 210/401; 210/409
[58] Field of Search ............... 210/400, 401, 783, 791, 210/210, 409, 410

[56] References Cited

U.S. PATENT DOCUMENTS

| | | | |
|---|---|---|---|
| 3,497,063 | 2/1970 | Hirs | 210/400 X |
| 3,899,426 | 8/1975 | Hirs | 210/400 X |
| 4,040,952 | 8/1977 | Jopp | 210/400 |
| 4,147,635 | 4/1979 | Crowe | 210/401 |
| 4,220,539 | 9/1980 | Lee | 210/401 |

Primary Examiner—Thomas G. Wyse
Attorney, Agent, or Firm—Hill, Van Santen, Steadman & Simpson

[57] ABSTRACT

A method and mechanism for dewatering fine coal or the like by a filtering operation including a horizontally disposed cylindrical housing defining a pressure chamber within, an intermittently movable filter belt wrapping support rolls for the belt at each end with the rolls having driving and braking devices, movable sealing devices positioned at openings to the chamber to seal the belt where it extends into and out of the chamber, a support for the belt with means for draining filtrate dewatered from the coal, and means to apply pressure to the chamber above the belt for dewatering the coal and for providing pressure beneath the support for the belt to balance forces within the housing.

21 Claims, 6 Drawing Figures

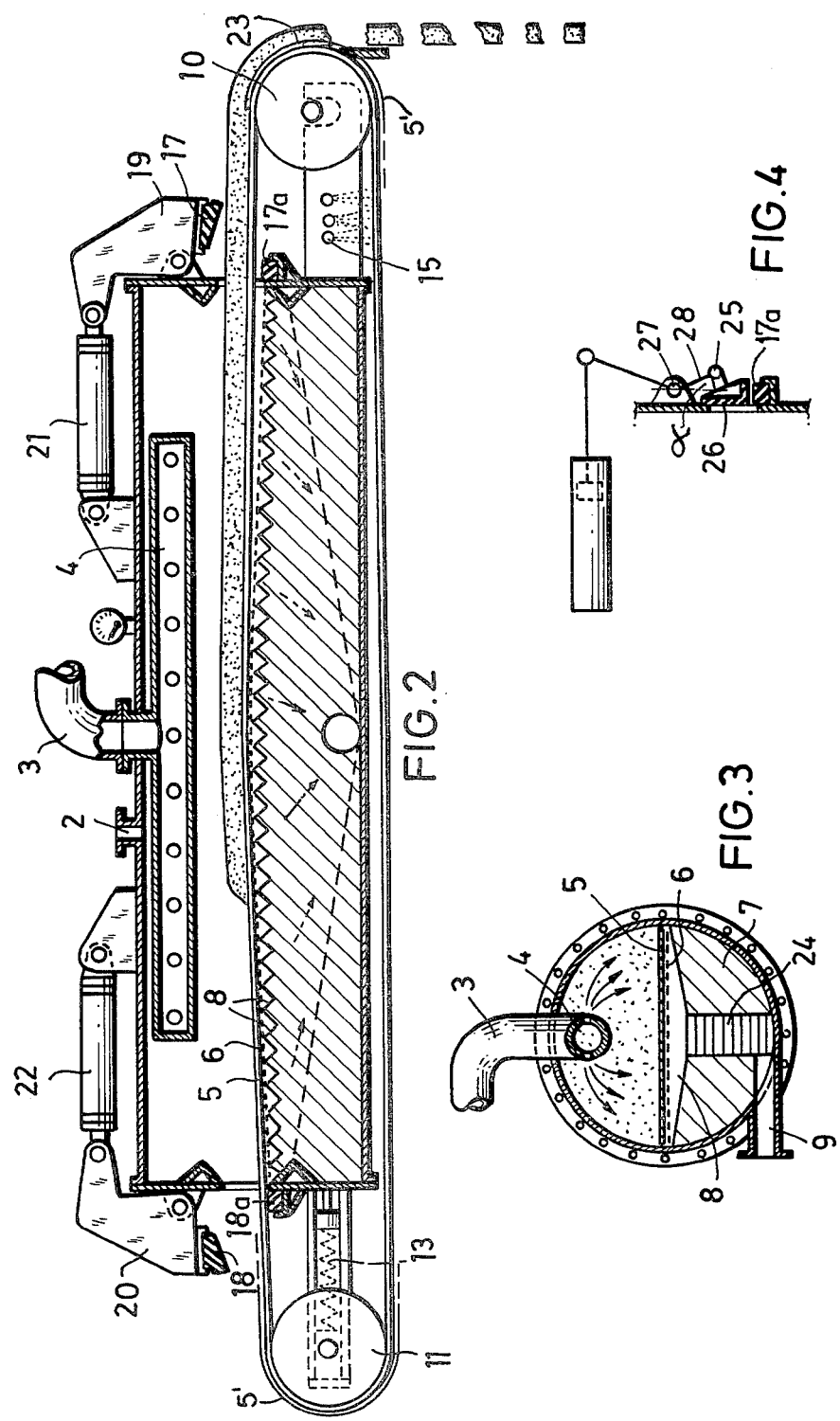

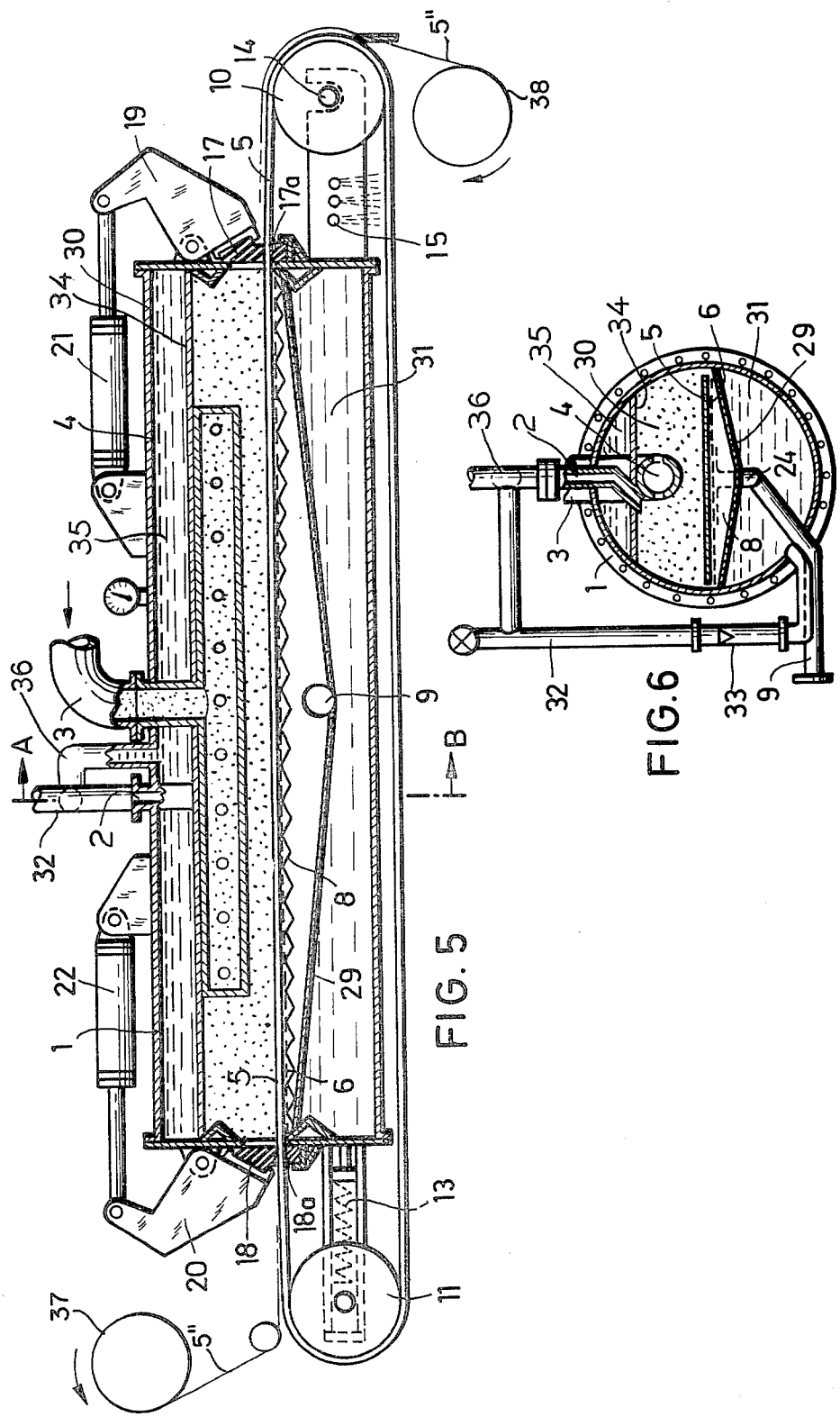

PRESSURE/BELT FILTER, PARTICULARLY FOR DEWATERING FINE COAL

BACKGROUND OF THE INVENTION

The present invention relates to improvements in a pneumatic pressure belt filter for dewatering fine coal including a method and mechanism utilizing a filter belt which intermittently passes through a pressure tank having movable sealing devices at the entry and exit from the tank.

In the art of pneumatic pressure belt filters, the filtrate chamber and the slurry chamber are frequently disposed in a yoke-like frame, and at least one of the two chambers may be pressed against the sealing surfaces of the other chamber over mechanical or hydraulic adjustment elements. A relatively complex filter means is involved.

One approach to simplify the structure and process is shown and described in German OS No. 20 62 345 wherein the filtrate chamber and slurry chamber are interconnected over an axis so that they can be angled or pitched upwardly with the axle serving as the axis of rotation. This mechanism is still relatively complex, particularly at high pressures and requires a substantial wall thickness, reinforcing ribs and so forth which lead to a very heavy construction.

An object of the present invention is to provide a pressure belt filter which is designed to be constructed in a uniquely simple and light manner, but which is capable of being operated at high pressures.

A feature of the invention is achieving the foregoing objective by constructing the pressure tank of a pressure belt filter as a cylindrical horizontal chamber which has rectangular openings for the endless filter belt passing therethrough. The pressure tank being cylindrically designed provides for a distribution of stresses so that it can be constructed with the smallest possible wall thickness. This structural concept also accommodates relatively simple manufacture of the pressure tank. The discharge openings are kept advantageously small and are in the form of rectangular openings for the filter belt requiring relatively low closing forces for the opening. Overall, the present concept accomplishes a light and simple execution and construction for a pneumatic pressure belt filter.

It has been discovered that the diameter of the cylindrical chamber is advantageously in the range of 50 to 150 cm, and more particularly, a diameter of 80 to 120 cm is preferred. The range between 50 and 150 cm is particularly advantageous for the working pressures of 2 through 6 bar regarding the weight per cm$^2$ of filter surface whereby the range of size between 80 and 120 cm produces an optimization concerning the pressures, the overall weight of the device, and the filter surface. A diameter of 1 m and a working pressure of 4 bar has been found to be useful in operation with the compressed air provided from normal compressed air sources available in shops.

A further feature of the invention is that the filter belt is designed as a perforated metal endless belt. Filter belts heretofore used incorporated fabric, whether synthetic or metal, and required a high closing pressure to close the exposed cross-section areas existing between the individual threads of a synthetic or fabric belt.

With a perforated metal tape, a blocked cross-section advantageously exists between the individual holes and the closing force to be exerted can be considerably reduced.

A further feature of the invention is that the metal belt is constructed with zones without openings for filtered passage with the spacing between such zones corresponding to the spacing of the sealing devices, that is, the spacing between the openings to the cylindrical chamber. It is thus possible to advantageously seal the belt on a completely smooth metal surface at such zones without openings. This provides a problem-free seal which can be controlled. Further, an easy and thorough cleaning of the sealing area is possible. The only requirement is that the total length of the tape and its zones without opening correspond to a multiple of the spacing of the sealing devices.

A further feature of the invention is that the lower half of the cylindrical pressure tank contains fill equipment providing support and guide and collecting devices for the filtrate. A particularly favorable support for the belt with a uniform distribution of the pneumatic filtering forces on the pressure tank is thus obtained. The bridge-type structure for supporting the forces which are involved with higher pressures which were necessary in structures heretofore available is eliminated.

A further feature of the invention is that needle slot or bar screen is positioned on the upper side of the filler material which is located in the lower half of the cylindrical chamber. This needle slot screen provides substantial surface seating for the filter belt, but obtains unimpeded passages for the filtrate into the filtrate guide and collecting devices in the lower half of the chamber.

A further feature of the invention is the provision of pillow-like sealing devices at the rectangular openings leading to and from the chamber, and the pillow-like devices preferably are constructed of soft rubber with a steel backing carrier.

An advantage obtained from the pillow-like design of the sealing devices is that their surfaces do not lose their function even with surface irregularities occurring. The soft rubber adapts to the irregularities. Grains or the like which have not been completely removed are not disruptive since sufficient sealing surface for a faultless sealing is available due to the pillow seal shape. The steel belt on its steel support coacts with the pillow seal providing stability in operation.

The pillow-like sealing devices are constructed with an inside lip. This inside lip coacts with the steel filter belt improving the sealing effect with increasing pressure so that the sealing devices can be constructed lightweight. The lip is constructed with a width no greater than necessary so that it can be easily withdrawn or pivoted out of the filter cake on the belt.

A further feature of the invention resides in that the filter belt is looped or endless and is supported on spaced transport and deflection rolls which are driven by internally disposed motors which are preferably brake motors. A particularly compact structure of the belt drive is thus obtained with the use of brake motors, and the roll support obtains a precise positioning of the filter belt relative to the sealing zones.

In accordance with a preferred construction, the transport and deflection rolls are movable so that they can be raised and lowered. With this construction, the deflection rolls can lift the filter belt after termination of the filter operation so that the friction between the filter belt and its support is considerably reduced or essentially eliminated. This also increases the useful life of the filter belt. The raising and lowering of the filter belt can be attained by means of separate lifting elements, but also can be attained by using the torque in the startup of the belt transport.

In a preferred construction, the filter belt is designed as a woven steel belt with uniform smooth tape edges. A good lateral guidance and seal is enabled by the uniform tape edges to thereby further improve the filter operation.

In a preferred construction, a lapping belt is laid over the filter belt with the lapping belt formed of a fabric or other material, and this construction is frequently employed for the filtration of materials other than coal such as when used in the food industry. The fabric which is laid over the filter belt need not be endless but may be fed down onto the top of the filter belt from a supply roller.

A further feature of the invention is that the sealing devices are supported on lever actuator or carrying devices so that the motion of the sealing devices relative to the filter belt is at an angle of 20° to 45°, and more preferably between 30° and 40° relative to a vertical line normal to the plane of the belt. This direction of movement of the sealing devices is particularly favorable for the pressure between the filter belt and the sealing surfaces and accomplishes a reliable fault-free seal of the area.

A further feature of the structure is that the pressure tank is divided by a horizontal partition plate below the filter belt and needle slot screen to provide a working space and a support space so that the support space under the partition plate is filled with fluid for a pressure balancing force.

A stable support for the filter belt and the underlying or supporting needle slot screen is attained by the aforedescribed construction. The support thus utilizes the concepts of air pressure and is not constructed so as to provide entire support by mechanical strength so that the support can be easily removed for repair or maintenance by bleeding out the pressure support fluid beneath the support. Ease of accessibility to the support space is thus assured, and uniform all-around pressure distribution against the inside walls of the cylindrical pressure tank is achieved by utilizing pressurized air as a support beneath the belt as well as the medium for forcing liquid from the coal or other material supported on the filter belt.

In accordance with the foregoing construction, the support space is interconnected with the space above the belt by a compensation pressure pipe having a pressure level indicator connected to the compressed air intake line for the workspace. In other words, the workspace pressure above the belt is related by a predetermined relationship to the support space below the support beneath the belt. The support space is provided with an aeration valve and a compensation pipe whereby a predetermined uniform pressure can be exerted and maintained. The level display in the pressure compensation pipe enables simple monitoring of the level of support fluid below the support plate.

In one form, the filter mechanism is operated automatically by an automatic timer control so that the filtering functions can be cycled and the mechanism be operated independent of manual control.

It is contemplated that a plurality of individual filters may be combined to form a filter unit to better exploit installation space such as by disposing the filters one above another such as when a battery of more than three filters is employed to achieve a continuous overall filter operation with only a slight pulsation or lack of uniformity of the constant throughput. With this arrangement, the continuity of output differs only inconsequentially from known disk or drum pressure filters.

Other objects, advantages and features, as well as equivalent methods and structures which are intended to be covered herein, will become more apparent from the teaching of the principles of the invention in connection with the disclosure of the preferred embodiments thereof in the specification, claims and drawings, in which:

DESCRIPTION OF THE DRAWINGS

FIG. 2 is another vertical sectional view similar to FIG. 1 illustrating the relative appearance of the elements at the end of a filter operation when the filtered material is being discharged;

FIG. 3 is a vertical sectional view taken substantially along line III—III of FIG. 1;

FIG. 4 is a side elevational view shown substantially schematic in form of the linkage arrangement for operating the end seals;

FIG. 5 is a vertical sectional view, similar to FIG. 1, but illustrating a modified form of the invention with a pneumatic support for the mechanism beneath the belt; and FIG. 6 is a vertical sectional view taken substantially along line A-B of FIG. 5.

DESCRIPTION OF THE PREFERRED EMBODIMENTS

Figure 1:
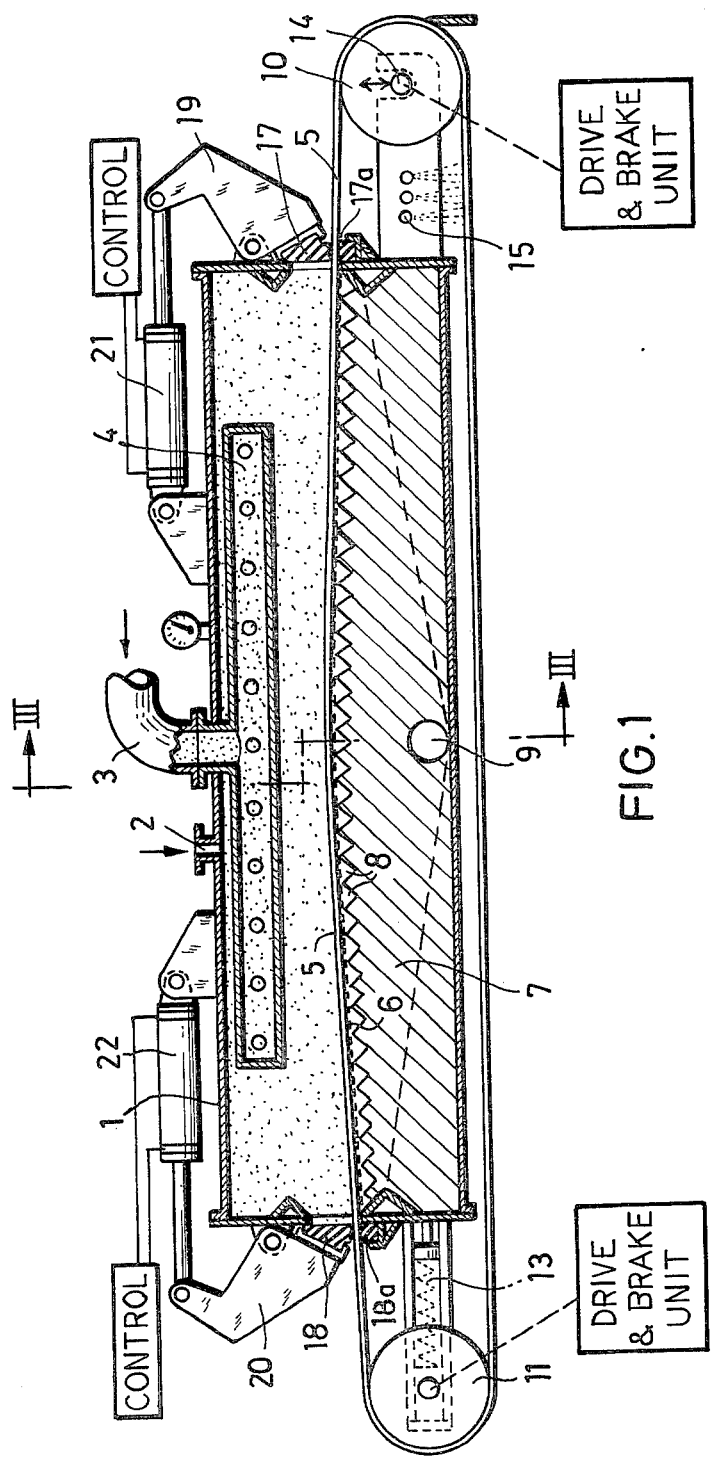
FIG. 1 is a vertical sectional view taken through a filter constructed and operating in accordance with the principles of the present invention with portions of the elements shown in schematic form.

FIG. 1 illustrates a cylindrical pressure tank having an enclosing housing 1 which is cylindrical in cross-sectional shape as illustrated in FIG. 3. The housing is a cylindrical tube with flanges at the end to accommodate the attachment of end walls at the flanges such as by rivets or bolts.

The housing has an inlet pipe fitting 2 for compressed air. A further inlet connection into the housing is provided at 3 for receiving the suspension to be filtered within the upper portion of the housing, and for example a slurry of fine coal suspended in water is fed in through the inlet pipe 3 which connects to an elongate horizontal distributor 4 for delivering the slurry throughout the interior of the upper chamber within the housing.

An endless continuous filter belt 5 has an upper portion extending through the housing. The operative portion of the belt which is located within the pressure chamber is supported on a needle slot or bar screen 6 which is mechanically supported by a fill or framework 7 beneath the screen 6 which supports the flexible belt. The framework 7 is preferably arched upwardly through the center of the housing so as to insure that the belt will be supported in a wrinkle-free condition. The framework or fill 7 may be formed of a noncompressible synthetic or of a cement or porous ceramic material which fills the lower portion of the housing and supports the downward forces on the belt transferring the forces to the housing.

The endless filter belt 5 is guided and driven by rolls 10 and 11 which are preferably constructed as hollow drum motors with a braking device on the internal surface. The rolls are preferably coated with rubber on their outer surface for protecting and preserving the filter belt and for the better transmission of a driving torque when the rolls are turned and the belt is driven forwardly. The roll 11 is provided with a tension device 13 for providing the necessary belt tension, and at the other end the roll 10 is provided with a lifting device 14 for lifting the belt during discharge operation which reduces wear and drag of the belt on its support.

A belt cleaning device 15 is provided having a shower or brush device located at the underside of the belt.

At the entrances to the housing for the belt, are located sealing pillows 17 and 18 which preferably are constructed of soft rubber such as having a Shore hardness of 50, and the pillow seals achieve sealing at the openings to the housing even with slight belt irregularities or contaminations which remain between the seal and the edges of the housing opening.

The seals are operated by hydraulic cylinders 21 and 22 which are electrically controlled such as by valves which admit air pressure to the opposite ends of the cylinders which contain double acting pistons.

Compressed air may also be used for operating the drives for the rolls 10 and 11 and the brakes, and the lift mechanisms 14 as well as additional cleaning devices, not shown in detail. Thus, compressed air is used for the operating mechanisms, but primarily for achieving a pressure on the material above the belt, and additionally for providing a support below the belt in the form of structure shown in FIG. 5 which will be described in further detail later herein. For operation of the device, particularly for automatic operation, sequential control mechanisms may be provided which supply the suspension in the housing above the belt, pressurize the suspension, operate the pillow seals 17 and 18 at the end of the housing and subsequently which advance the belt 5. Such automatic control can be utilized with a series of filters to provide constant output for the overall mechanism.

When a batch of suspension has been supplied to the upper chamber of the housing, and has been filtered with the admission of fluid such as liquid or air pressure in the upper chamber through the line 2, and filtered material collects on top of the belt, the pressure in the chamber is subsequently relieved, the pillow seals 17 and 18 removed, and the belt advanced in the manner shown in FIG. 2.

The belt drum 10 is lifted to aid in discharging the filter cake 23 off the end of the drum 10 as the belt is advanced.

As illustrated in FIG. 3, during the filtering operation, the filtrate passes down through the belt 5 and into the filtrate collector channels 8 beneath the belt support. The channels are supported on the fill 7, and from the channels 8, the filtrate runs toward the center toward a filtrate connector 24 which discharges the filtrate through a discharge pipe 9. The filtrate collecting and guiding devices which constitute the channels 8 are open at the top and permit the downward and centering flow of the filtrate.

FIG. 4 illustrates the mechanism for operating the pillow seals, and the sealing arrangements at the rectangular openings to the chamber. The sealing pillows are formed of a soft rubber layer having a thickness of 20 through 50 mm. The pillow seals are mounted on steel carriers 25 which are supported on lever arms 28 pivoted at 27, and the construction of the supports for the seals are such that the seals approach the opening in the chamber at an angle $\alpha$ between 25° and 45°, preferably approximately 35°.

A cross-sealing bar 17a and 18a, preferably of a soft, pillow-like rubber material is positioned beneath the belts opposite the upper pillow seals so that as the upper seals move downwardly against the belt, it is clamped between the upper seal 17 and lower seal 17a at one end of the chamber, and between the upper seal 18 and lower seal 18a at the other end of the chamber.

The seal moving downwardly from above has an angle between 25° and 45°, and preferably 35°, and this movement exhibits a wedging clamping action against the belt and provides an effective, reliable seal against substantial leakage from the chamber.

FIG. 5 illustrates a modified arrangement of the housing 1 and the pressure chamber 30. In this construction of FIG. 5, a partition or support plate 29 extends through the center of the housing, and the fill which was utilized in the construction of FIG. 1 is omitted. A removable needle slot screen 6 is supported on the partition plate 29, and the plate 29 is shaped so that it provides a filtrate guide and collecting channel construction such as illustrated in FIG. 6 which leads the filtrate toward the center of the lower portion of the chamber and into a filtrate removal pipe 9.

In this further embodiment of the invention as shown in FIG. 5, the upper portion of the cylindrical pressure tank is divided with a horizontally extending intermediate ceiling or divider wall 34 which allows a pressure backing liquid to be delivered in the space 35 above the wall 34. With this arrangement, the same horizontal cross-sectional filtering area is available, but the chamber 30 for the liquid to be filtered is reduced in volume. Pressure build-up can occur more quickly in that it is not necessary to pump as much fluid into the workspace. The same pressure is applied to the liquid in forcing it down through the filtering surface and the stresses in the housing are not increased.

The space 35 is filled with water or other lightweight incompressible liquid through a line 36. The intermediate wall 34 is preferably constructed of a substantially rigid material, but does not have to provide substantial strength because pressure unbalances do not exist to any large degree. As will be observed in FIG. 6, pressurized fluid may be still delivered through the line 2 on the upper surface of the liquid being filtered, and this may be particularly used to clear the chamber 30 of liquid to be filtered before relieving the pressure and opening the seals.

As will be seen in FIG. 6, the chamber 31 beneath the support 29 is filled with liquid under pressure or to provide a balancing support beneath the belt. For purposes of achieving the correct balancing pressure in the chamber 31 beneath the support, a construction is adopted wherein the liquid pressure above the belt is balanced to be equal to the pressure below the belt. For this purpose, the two chambers are under the same pressure and share a common supply 2. A compensation pressure pipe 32 has a level indicator 33 indicating pressures above and below. The pressure below uniformly distributes its upward force across the support channels 8 equal to the distribution of the pressure above the belt so that structural stresses are eliminated with a very simple and lightweight designed construction. This force balance also contributes to the possibility of reducing the strength and weight of the housing 1.

FIG. 2 illustrates an endless lapping belt 5'. As mentioned above, and as schematically illustrated in FIG. 5, a lapping belt 5" may be laid over the filter belt 5. The lapping belt may be a fabric or other material. For certain applications, and as previously pointed out, the lapping belt is not necessarily an endless belt which would co-rotate with the filter belt 5, but may be fed onto the top of the filter belt from a supply roller. In FIG. 5, the belt 5" is fed from a supply roller 37 and is schematically illustrated as being taken up by a take-up roller 38.

In operation as the slurry of material is fed into the chamber above the belt, the chamber above the belt and chamber below the support channels 8 are simultaneously pressurized an equal amount. Since the interior of the channels 8 and the support 6 are not pressurized, the dewatering of the material above the belt occurs rapidly and smoothly so that the stress and force balancing effects of the fluid pressure do not adversely affect the filtering operation of the overall mechanism.

The pressure belt filter construction previously described is primarily advantageous in the filtration of fine coal, although in other suspensions such as in ore processing or food preparation, the features of the invention may be employed.

Another structural modification contemplated is to provide steam instead of air to the material above the belt so that the surface tension of the liquid is reduced and capillary dewatering is possible. Superheated steam can be employed so that a penetrating heating of the filter cake can be accomplished to more than 100° C. without allowing condensation to remain in the filter cake.

Thus, it will be seen that we have provided an improved structure and method for filtering material which meets the objectives and advantages above set forth, and various modifications and alterations of the structure and method within the spirit and scope of the invention may be utilized.

We claim as our invention:

1. The method of dewatering fine coal or the like comprising the steps of:
   supporting a belt horizontally with a noncompressible structure within a closed cylindrical chamber;
   placing a suspension of material on the horizontal surface of the belt;
   pressurizing the upper surface of the belt to force filtrate through the belt while simultaneously admitting an equal fluid pressure beneath the belt to balance the forces thereon;
   and intermittently opening the chamber and moving the belt out of the chamber to carry filter material out of the chamber.

2. A pressure belt filter for dewatering fine coal or the like comprising in combination:
   a horizontal cylindrical housing defining an upper pressure chamber and a lower support space therein and including a pair of ends, each of said ends including an opening therein;
   a noncompressible support mounted in said support space;
   an intermittently movable filter belt within the chamber extending through said openings and carried on said noncompressible support for receiving a suspension of material to be filtered with fluid pressure applied to the upper surface of the material on the belt and filtrate removed from below the belt;
   and movable sealing devices positioned at said openings to said chamber so that the sealing devices may be moved from the openings to move the filtered material out of the chamber.

3. A pressure belt filter for dewatering fine coal or the like constructed in accordance with claim 2:
   wherein the diameter of said cylindrical housing is in the range of 50 cm to 150 cm.

4. A pressure belt filter for dewatering fine coal or the like constructed in accordance with claim 2:
   wherein said belt is a perforated metal band.

5. A pressure belt filter for dewatering fine coal or the like constructed in accordance with claim 2:
   wherein said belt has areas without filter openings for filtrate spaced apart a distance equal to the spacing of said sealing devices.

6. A pressure belt filter for dewatering fine coal or the like constructed in accordance with claim 2:
   wherein said noncompressible support for the belt includes filtrate collecting devices.

7. A pressure belt filter for dewatering fine coal or the like constructed in accordance with claim 2:
   wherein said noncompressible support is provided for the belt includes a bar screen supporting the screen and admitting the passage of filtrate.

8. A pressure belt filter for dewatering fine coal or the like constructed in accordance with claim 2:
   wherein said sealing devices comprise a soft rubber with a rigid metal support backing.

9. A pressure belt filter for dewatering, fine coal or the like constructed in accordance with claim 8:
   wherein the sealing devices each include a lip element for engagement with the upper surface of said belt.

10. A pressure belt filter for dewatering fine coal or the like constructed in accordance with claim 2:
    wherein the belt is further supported on spaced rolls with driving and braking devices for the rolls and the rolls are positioned outside of the chamber.

11. A pressure belt filter for dewatering fine coal or the like constructed in accordance with claim 10:
    with means for elevating and lowering at least one of the rolls for moving the belt to carry filtered material out of the chamber.

12. A pressure belt filter for dewatering fine coal or the like constructed in accordance with claim 2:
    wherein the belt is formed of a steel fabric with continuous lateral edges.

13. A pressure belt filter for dewatering fine coal or the like constructed in accordance with claim 2:
    including a fabric second belt positioned on the upper surface of the filter belt and moving therewith.

14. A pressure belt filter for dewatering fine coal or the like constructed in accordance with claim 2:
    wherein the sealing devices are movable against the chamber openings in a direction toward the openings and toward the belt at an angle between 20° and 40° relative to a plane normal to the belt.

15. A pressure belt filter for dewatering fine coal or the like constructed in accordance with claim 2:
    wherein the chamber is divided horizontally by a separation member and means are provided for admitting an air pressure beneath the divider for balancing the forces above the belt.

16. A pressure belt filter for dewatering fine coal or the like constructed in accordance with claim 2:
    including means for admitting air pressure force beneath the belt and for balancing forces above and below the belt.

17. A pressure belt filter for dewatering fine coal or the like constructed in accordance with claim 2:
   with means for admitting steam to the pressure chamber above the belt.

18. A pressure belt filter for dewatering fine coal or the like constructed in accordance with claim 1:
   including a fabric second belt carried over said filter belt and movable therewith in the chamber.

19. A pressure belt filter for dewatering fine coal or the like comprising in combination:
   a cylindrically shaped horizontally elongate housing including a belt entry and a belt exit and defining a filter chamber therein;
   an endless filter belt movable through the chamber and extending through said belt entry and said belt exit for receiving a suspension of material on the upper surface thereof;
   a noncompressible structure including a horizontal support for the belt within the chamber;
   means above the belt for admitting a suspension of material into the chamber and onto the belt;
   means for pressurizing the chamber above the belt;
   outlet means for removing filtrate from beneath the belt;
   movable seals for sealing said belt entry and said belt exit from the chamber;
   and means for intermittently moving the belt for carrying filtered material out of the chamber on the belt.

20. A pressure belt filter for dewatering fine coal or the like constructed in accordance with claim 19:
   wherein said noncompressible structure includes means for admitting fluid pressure beneath the horizontal support to balance the forces on the belt.

21. A pressure belt filter for dewatering fine coal or the like constructed in accordance with claim 19:
   including a wall member extending through the housing dividing the chamber above the belt into an upper chamber connected to a fluid pressure means and a lower chamber above the belt receiving said suspension of material.

* * * * *